May 1, 1945. R. K. ILER 2,375,000
MANUFACTURE OF SODIUM SULPHATE AND CHLORINE
Filed Dec. 23, 1939
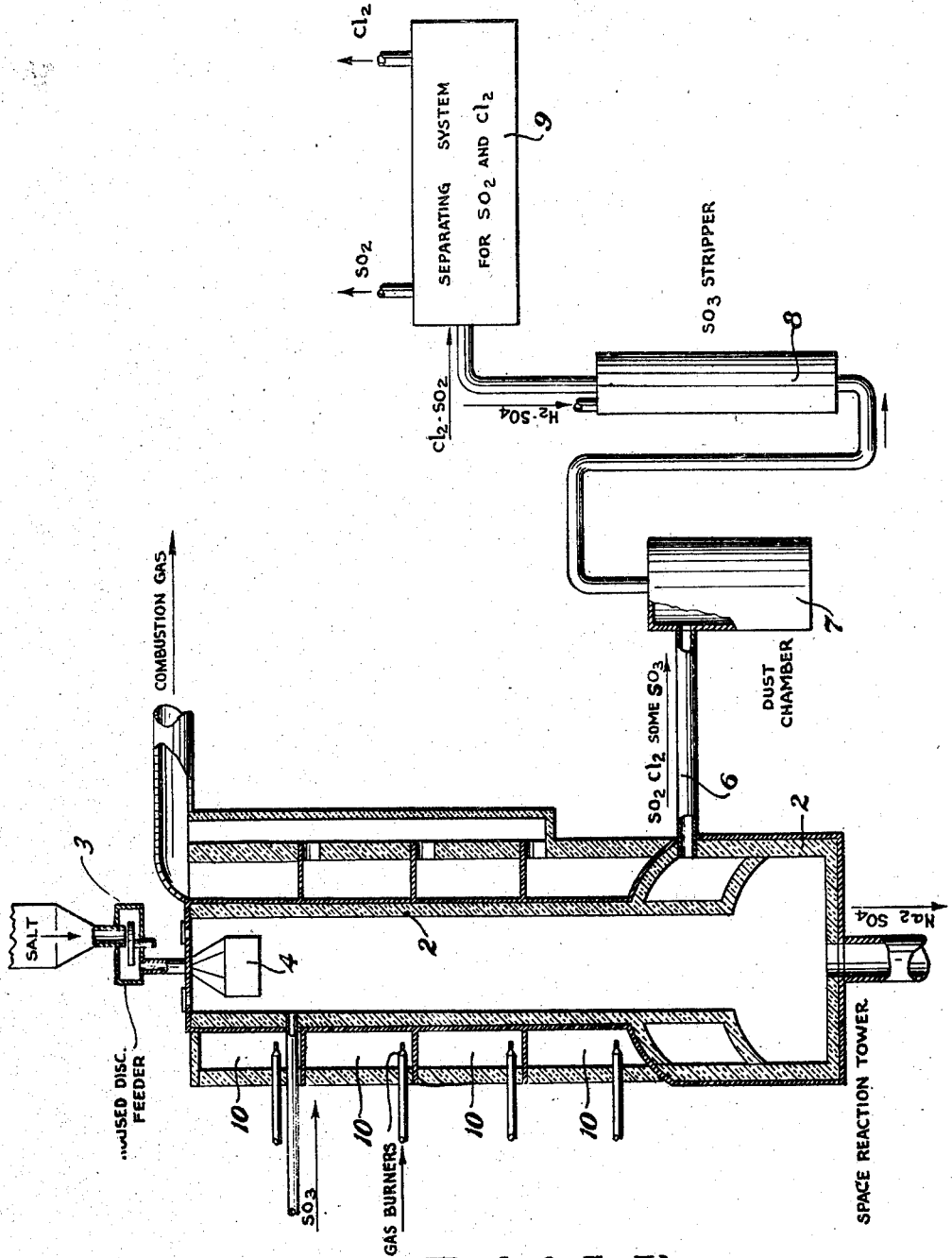
Ralph K. Iler  INVENTOR.
BY George Johnnesen
ATTORNEY.

Patented May 1, 1945

2,375,000

UNITED STATES PATENT OFFICE 2,375,000

MANUFACTURE OF SODIUM SULPHATE AND CHLORINE

Ralph K. Iler, East Cleveland, Ohio, assignor to E. I. du Pont de Nemours & Company, Wilmington, Del., a corporation of Delaware Application December 23, 1939, Serial No. 310,836

5 Claims. (Cl. 23—121)

This invention relates to the manufacture of chlorine and sodium sulphate and is directed to the production and recovery of chlorine from the action of sulphur trioxide on sodium chloride.

This invention is particularly directed to processes in which particles of sodium chloride are suspended in a gaseous atmosphere containing sulphur trioxide under conditions adapted to promote the formation of sodium sulphate until substantially all of the sodium chloride is converted to sulphate and separating the gaseous products of the reaction from the solid products.

It has long been customary in the art to manufacture sodium sulphate, or salt cake as it is called, by the action of sulphuric acid on sodium chloride. Hydrogen chloride is produced as a by-product, and if desired chlorine can be recovered therefrom by the well known Deacon process in which hydrogen chloride is oxidized by air with a copper chloride catalyst. This process has the disadvantage of going through an intermediary, namely, the hydrogen chloride, and also that chlorine is produced in admixture with oxygen and nitrogen.

As a consequence the art has long sought a more direct method and many suggestions have been made for reacting sodium chloride with sulphur trioxide to produce sodium sulphate and chlorine. For example, it has been proposed to pass heated sulphur trioxide in admixture with air or oxygen through masses of heated sodium chloride. It has also been suggested to react sulphur trioxide with porous briquettes of sodium chloride. None of these processes, however, have proved practical for one reason or the other and particularly because of the tendency of the reaction mass to agglomerate and fuse under the conditions of the reaction.

I have now found that the disadvantages of the prior art processes may be avoided by reacting particles of sodium chloride free in space in a gaseous atmosphere of sulphur trioxide under conditions promoting the formation of sodium sulphate.

My invention may be more fully understood from a consideration of some of the reactions involved and the possible different products obtainable by the action of sulphur trioxide on sodium chloride. At low temperatures sulphur trioxide combines with sodium chloride to form sodium chlorosulphonate. At higher temperatures sodium pyrosulphate is formed and sulphur dioxide and chlorine are liberated. At still higher temperatures the products are sodium sulphate, sulphur dioxide, and chlorine. The gaseous mixture evolved from these reactions contains sulphur dioxide and chlorine in substantially equimolecular proportions as represented by the following equation:

$$2NaCl + 2SO_3 \rightarrow Na_2SO_4 + SO_2 + Cl_2$$

Such mixtures of sulphur dioxide and chlorine are highly reactive and in some respects are more so because of the equimolar nature of the mixture. In the presence of water, for example, sulphuric acid and hydrochloric acid are formed. In the presence of activated carbon and many organic compounds, interaction between sulphur dioxide and chlorine takes place. In the presence of metals the corresponding metal chlorides are formed, especially at high temperatures. Similarly, in the presence of metallic oxides oxychlorides are frequently formed, especially at high temperatures. The complex nature of the solid products which may contain in addition to sodium chloride any one or more of sodium sulphate, sodium pyrosulphate and sodium chlorosulphonate, and the difficulty of obtaining proper conversion of salt to sodium sulphate have presented insurmountable difficulties in the prior art.

In carrying out the processes of my invention I obtain rapid and intimate contact between salt and sulphur trioxide by causing finely divided salt to be suspended in or to pass through a gaseous atmosphere of sulphur trioxide under conditions such that coalescence of the particles and caking on the apparatus is avoided. The gaseous products emanating from the reaction zone in the suspension reactor contain solid particles composed essentially of sodium sulphate suspended in the gas mixture and the gas mixture is composed essentially of equimolecular proportions of sulphur dioxide and chlorine. Sulphur trioxide may sometimes be present if the reaction is not carried substantially to completion. The gaseous mixture may be treated to separate solid particles and treated to recover the chlorine in any suitable manner, or the gas mixture may be utilized for the formation of sulphuryl chloride or in such reactions as require mixtures of sulphur dioxide and chlorine.

The reaction between sulphur trioxide and salt may be carried out in the presence of oxygen and a reaction promoter that will not contaminate the finished salt cake, such as a volatile catalyst or a silent electric discharge, so as simultaneously to oxidize the sulphur dioxide formed into sulphur trioxide which reacts further with the salt present so that the gas becomes progressively poorer in sulphur compounds and richer in chlorine. In this manner chlorine of a high state of purity can be readily and simply obtained.

The reaction between sodium chloride and sulphur trioxide may be carried out in any suitable space reactor, such as the space reaction tower 1 illustrated in the accompanying flow sheet. This reaction tower includes the cylindrical reactor 2 constructed of material chemically resistant to the products of the reaction and the reagents at the temperature of the reaction and mounted with its axis in a vertical position. Means as shown at 3 and 4 are provided whereby highly pulverized sodium chloride is rapidly and intimately dispersed in the reagent gas usually as it enters the reactor as shown at 5. The solid products consisting essentially of sodium sulphate fall to the bottom and the gaseous products consisting essentially of equimolecular quantities of sulphur dioxide and chlorine together with small quantities of sulphur troxide and dust pass out through the conduit 6 through the dust chamber 7, the sulphur trioxide stripper 8 and on to the separation system 9 or to such other use as may be indicated for equimolecular mixtures of sulphur dioxide and chlorine. Various details of construction of the reaction tower, such as the heating chambers 10, are illustrated but these details do not form any part of the present invention, and any suitable means for maintaining proper temperatures in the reaction zone may be employed. Space reactors of this type are characterized by the continuous exposing of individual particles of salt to sulphur trioxide in which the flow of salt and sulphur trioxide is cocurrent and permits of a state of subdivision of the salt and correspondingly increased surface exposure together with a state of fusion in the partially reacted salt and sodium sulphate which has not been possible according to the processes of the prior art.

Depending upon the temperature at which the reaction between salt and sulphur trioxide is effected a wide variety of products is obtained. Thus, at ordinary or slightly elevated temperatures, for example, from 40 to 100° C. sulphur trioxide reacts with sodium chloride to form sodium chlorosulphonate. If sodium chloride and sulphur trioxide are reacted at around 150° C. the sodium chlorosulphonate first formed further reacts with sulphur trioxide forming sodium pyrosulphate and sulphur pentoxydichloride. The latter compound is unstable above about 200° C., decomposing to form sulphur trioxide, sulphur dioxide, and chlorine. If sodium chlorosulphonate is formed at ordinary temperature and then heated to about 230° C. it is thermally decomposed to form sodium pyrosulphate, sodium chloride, sulphur dioxide, and chlorine. If the mixture of sodium chloride and sodium pyrosulphate thus formed is heated further to about 400° C. it is decomposed to sodium sulphate, chlorine, and sulphur dioxide. If sulphur trioxide is present at this temperature it reacts with the sodium sulphate to form sodium pyrosulphate. At a temperature between 400 and 500° C. the sodium pyrosulphate becomes dissociated, yielding sodium sulphate and sulphur trioxide, the partial pressure of sulphur trioxide at equilibrium depending upon the temperature.

By carrying out the reaction in a space reactor of the character I have described distinct advantages are obtained as compared with carrying out the reaction in a rotary type reactor notwithstanding that in the latter salt may be showered through an atmosphere containing sulphur trioxide. These advantages arise because of limitations imposed upon rotary operations due to the widely differing reactions possible between sodium chloride and sulphur trioxide and the low melting point of the sodium chloride-sodium sulphate eutectic. Thus when the reaction is carried out in a rotary reactor where the particles of salt are repeatedly picked up and dropped through the gaseous atmosphere the temperature must be maintained within limits of about 475° C. to about 600° C. and preferably even more critically within such narrow limits as 525° C. and 550° C. If the temperature is allowed to become too low the sodium pyrosulphate formed exerts a deleterious influence upon the operation of the rotary in causing the mass to become wet and sticky and thus leading to caking and also to inefficient contact between gas and solid particles. Similarly if the temperature is allowed to become too high the formation of the sodium sulphate-sodium chloride eutectic composition causes coalescence, caking and poor contact in much the same manner. Theoretically the temperature could be allowed to go as high as 630° C., that is, the melting point of the sodium chloride-sodium sulphate eutectic, but as a practical matter especially if strong sulphur trioxide is employed such a high temperature could not possibly be employed because the reaction is exothermic and in the presence of strong sulphur trioxide gas the heating could not be so closely controlled as to prevent local overheating.

Hence, if strong sulphur trioxide gases are allowed to contact sodium chloride particles in a rotary reactor at too high a temperature, the heat generated by the reaction may cause the particles to exceed the melting point of the sodium sulphate-sodium chloride eutectic and thus to coalesce and cake in the bottom of the reactor. Consequently, when gases rich in sulphur trioxide are employed it is preferable that the temperature fall within the ranges previously pointed out.

While, in general, similar conditions will govern operation in a stationary reactor, an important advantage may be observed in that higher temperatures and an accompanying accelerated rate of reaction may be obtained without encountering the difficulties heretofore pointed out due to the formation of sodium chloride-sodium sulphate eutectic. In the stationary type reactor the solid phase is finely divided and suspended in the gas phase thruout the reaction, so it is not of particular moment if the suspended particles pass through a stage of incipient fusion or even through a fused state if the particles as collected are in the solid state. Consequently, whereas in a rotary reactor it was necessary to maintain relatively low temperatures due to the repeated passing of the small particles through the atmosphere and due to the possibility of local overheating by the heat of reaction, especially with strong sulphur trioxide gases, in a stationary reactor it is possible to take advantage of such local overheating and to obtain a zone of intense reaction in the center of the reactor in which temperatures materially in excess of the sodium chloride-sodium sulphate eutectic may obtain.

While the conditions of operation in a rotary reactor and a stationary reactor differ due to the different mechanics of the two reactions, nevertheless, there is a common factor which must be considered to obtain proper operation. Thus, if the particles passing through the gaseous reagent shall become fluid or semi-fluid due to the formation of sodium pyrosulphate or the sodium chloride-sodium sulphate eutectic and this fluid or semi-fluid state shall persist until the particles come in contact with the walls of the reactor, caking on the walls of the reactor will inevitably ensue. But caking in the stationary reactor is by no means the problem it is in the rotary reactor even though the temperatures in the center of the stationary reactor may materially exceed those which may obtain in the rotary reactor. To avoid caking on the walls the reaction in both cases should be carried out under conditions such that any of the particles coming in contact with the walls of the reactor are not at a temperature in excess of the temperature of the sodium sulphate-sodium chloride eutectic. Such conditions must be obtained in the rotary reactor by regulating the temperature within the limits described for the rotary type reactor, but in the stationary type reactor such conditions may be obtained additionally by controlling the temperatures adjacent the walls of the reaction chamber. This may be accomplished, for example, by maintaining a low temperature fluid curtain adjacent the walls of the reactor or by spraying the finely divided salt upwardly into the center of the reaction zone and allowing the reacted and partially reacted particles to fall back down adjacent the walls of the reactor. Stationary reactors of these types are well known in the art and need not be described in detail.

The state of sub-division of the salt will depend in a large measure upon the type of space reactor employed. In the truly suspension reactors such as the stationary reactors, it is desirable that the salt be very finely pulverized and it is desirable that it shall pass through a 100 mesh screen. It will be understood that those skilled in the art on consideration of the type of reactor involved will be able to determine the best state of sub-division for carrying out the reaction.

While I have specifically described one manner of recovering chlorine from the gaseous products of the reaction it will be understood that my invention in its broader aspects is in no wise limited to the manner in which the chlorine is recovered nor is my invention limited to the recovery of chlorine since mixtures of sulphur dioxide and chlorine may be advantageously used in processes such as are described in Reed Patents 2,174,111 and 2,046,090.

I claim:

1. In a process for reacting sulphur trioxide and sodium chloride the method which comprises dispersing sodium chloride in an atmosphere containing sulphur trioxide at a reactive temperature such that the products of the reaction are essentially sodium sulphate, sulphur dioxide and chlorine and such that the heat of the reaction causes the reaction temperature in at least a portion of the reaction zone to exceed the melting point of the sodium chloride-sodium sulphate eutectic and maintaining the sodium chloride dispersed in said atmosphere until substantially all the sodium chloride is converted to sodium sulphate.

2. In the manufacture of chlorine by the action of sulphur trioxide on sodium chloride the method which comprises passing the sodium chloride in co-current flow with, and free in space in, an atmosphere containing sulphur trioxide at a reactive temperature such that sulphur dioxide and chlorine are liberated as gaseous products of the reaction and the sodium chloride is substantially converted to sodium sulphate, and separating the gaseous products from the solid products, the length of co-current flow being so correlated with the rate of reaction that substantially all the sodium chloride is converted to sodium sulphate while it is still free in space in said atmosphere.

3. In a process for reacting sodium chloride and sulphur trioxide the method which comprises passing the sodium chloride in co-current flow with, and free in space in, an atmosphere containing sulphur trioxide at a temperature such that the heat of the reaction causes the reaction temperature in at least a portion of the reaction zone to exceed the melting point of the sodium chloride-sodium sulphate eutectic and the sodium chloride is substantially converted to sodium sulphate, and separating the gaseous products from the solid products, the length of co-current flow being so correlated with the rate of reaction that substantially all the sodium chloride is converted to sodium sulfate while it is still free in space in said atmosphere.

4. In a process for reacting sulphur trioxide and sodium chloride the method which comprises passing the sodium chloride in co-current flow with, and free in space in, an atmosphere containing sulphur trioxide at a reactive temperature such that the salt passes thru a reaction zone of sufficient extent that, and in which the reaction temperature sufficiently exceeds the decomposition temperature of sodium pyrosulphate, that the products of the reaction are essentially sodium sulphate, sulphur dioxide, and chlorine the extent of said reaction zone being so correlated with the rate of the reaction that substantially all the sodium chloride is converted to sodium sulphate while it is still free in space in said atmosphere and then separating the gaseous products from the solid products.

5. In a process for reacting sulphur trioxide and sodium chloride under conditions such that the gaseous products of the reaction are essentially sulphur dioxide and chlorine the method which comprises continously introducing the sulphur trioxide and sodium chloride into a stationary space reactor, keeping the sodium chloride dispersed in the gaseous atmosphere in said reactor and at a reactive temperature until substantially all the chlorine in said salt has been freed, and continuously removing the gaseous products of the reaction from said reactor, the strength of the sulphur trioxide introduced and the temperature in the reactor both being sufficiently high as to provide a zone of intense reaction in the center of the reactor in which temperatures materially in excess of the sodium chloride-sodium sulphate eutectic obtain.

RALPH K. ILER.